J. L. SWARTZ.
CUSHION TIRE AND METHOD OF MAKING THE SAME.
APPLICATION FILED APR. 5, 1917.
1,237,227.
Patented Aug. 14, 1917.
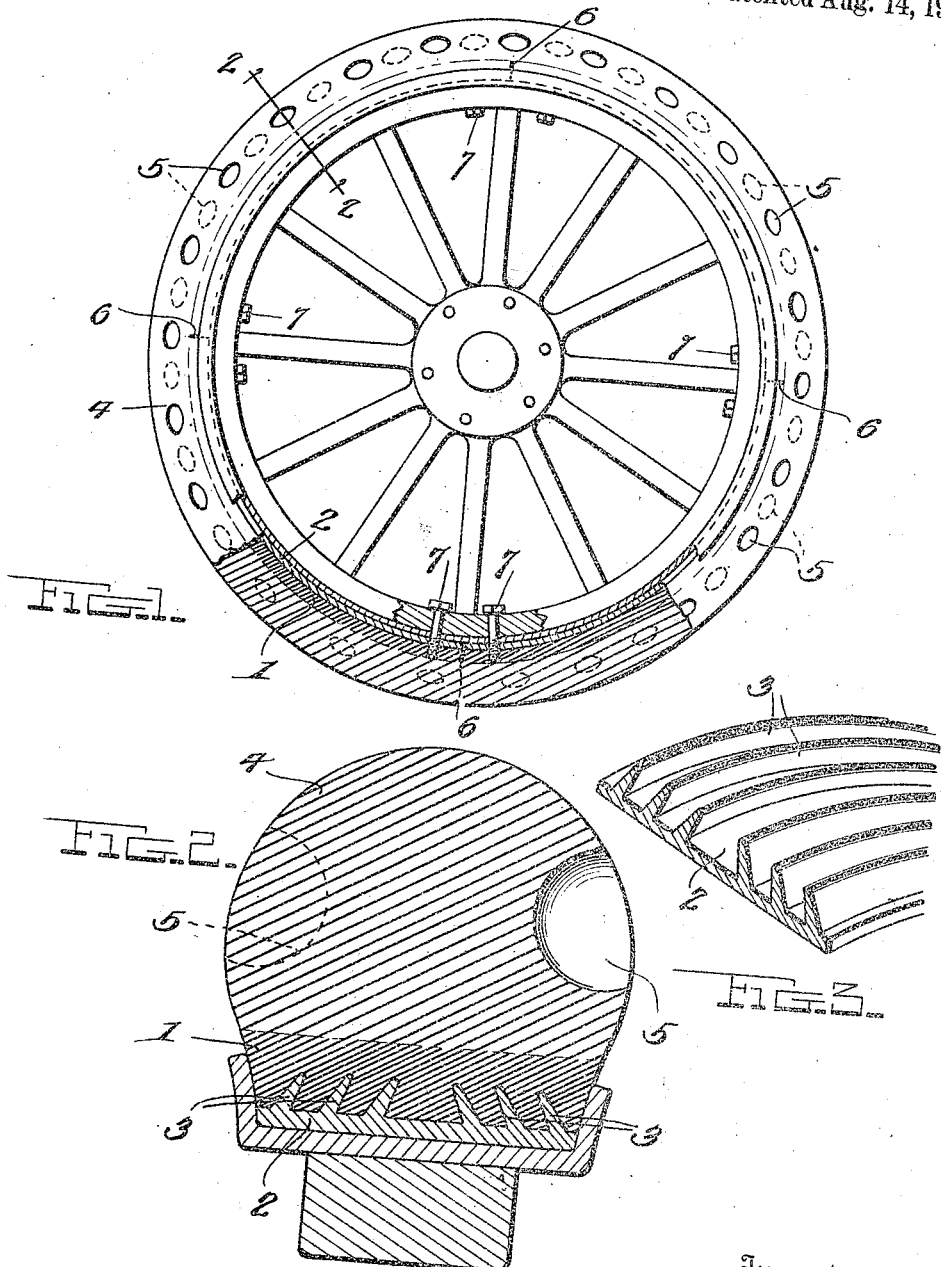
Witness
J. R. Pierce
Inventor
J. L. Swartz
By H. A. Wilson & Co.
Attorneys

UNITED STATES PATENT OFFICE.

JOHN L. SWARTZ, OF AKRON, OHIO.

CUSHION-TIRE AND METHOD OF MAKING THE SAME.

1,237,227.

Specification of Letters Patent.

Patented Aug. 14, 1917.

Application filed April 5, 1917. Serial No. 159,928.

*To all whom it may concern:*

Be it known that I, JOHN L. SWARTZ, a citizen of the United States, residing at Akron, in the county of Summit and State of Ohio, have invented certain new and useful Improvements in Cushion-Tires and Methods of Making the Same; and I do declare the following to be a full, clear, and exact description of the invention, such as will enable others skilled in the art to which it appertains to make and use the same.

My invention relates to improvements in reinforced expansible cushion tires and the methods of making the same, the object being to provide a simple and comparatively inexpensive tire having a reinforced base of hard rubber faced with a metal rim engaging band, and to construct said band and base so as to permit the tire to be expanded for application to rims permanently secured on the automobile wheels and having no detachable side rings.

With the foregoing general object in view, the invention resides in the method of constructing the improved tire and in the tire itself as shown in the accompanying drawing in which:

Figure 1 is a side elevation of the improved tire applied with parts in section;

Fig. 2 is a transverse section on the plane of the line 2—2 of Fig. 1; and,

Fig. 3 is a detail sectional perspective view of a portion of the rim engaging band.

In constructing the improved tire, a continuous comparatively hard non-yielding rubber base 1 is formed on a continuous rim engaging band 2, the latter having a plurality of oppositely inclining circumferential ribs 3 which are embedded in said base when the latter is molded on the band.

A continuous comparatively soft and highly yieldable rubber tread 4 is applied to the base 1 and the two are cured together by vulcanizing or any other suitable process, the sides of said tread preferably having cavities 5 of suitable shape, the cavities on one side being staggered in respect to those on the other.

After the tire has been constructed as described, either before or after the vulcanizing process, a number of transverse slits 6 are formed across and through the band 2 and the base 1, the slitting being preferably done by a suitable saw. The provision of the slits in question permits the tire to be expanded for passage over the side ring of an automobile rim, the only resistance to this expanding being the yieldable tread 4 but the latter is of such character as to permit it to stretch the required amount.

After applying the tire to the rim, screws 7 are preferably passed outwardly through the felly and rim and threaded into the band 2 and base 1 on opposite sides of the slits 6.

The improved tire will be highly efficient and durable, being efficiently reinforced by the hard rubber base 1 and the metal band 2, whereas the tread 4 is highly yieldable and is rendered more so by the cavities 5. Regardless of the efficient character of the reinforcing means described, the formation of the transverse slits therethrough permits the tire to be easily attached to and detached from the rim even though the latter be permanently secured on the wheel and be provided with no detachable side rings.

I am aware that tires of the general nature described have been heretofore used, but in so far as I am advised, all of these tires are provided on their bases with cast metal blocks which contact with the rim. These tires are undoubtedly efficient when in use, but due to the several disconnected blocks, they are much harder to construct than the improved tire in which the band 2 and base 1 are formed as a single piece and later slit transversely.

I claim:—

1. A cushion tire comprising a metal rim engaging band, a comparatively hard non-yielding rubber base surrounding said band and permanently joined thereto, and a comparatively soft and highly yieldable rubber tread surrounding and cured on said base, transverse circumferentially spaced slits being formed through and entirely across said band and base to allow the tire to expand for application to a rim.

2. The method of making an expansible reinforced cushion tire consisting in molding a continuous comparatively hard nonyielding rubber base on a continuous metal rim engaging band, curing a comparatively soft and highly yieldable rubber tread on said base, and forming transverse slits through and across said band and said base.

In testimony whereof I have hereunto set my hand in the presence of two subscribing witnesses.

JOHN L. SWARTZ.

Witnesses:
 WALTER J. HELMKAMP,
 JACOB HEDDESHEIMER.